US006900964B2

(12) United States Patent
Argumedo et al.

(10) Patent No.: US 6,900,964 B2
(45) Date of Patent: May 31, 2005

(54) DATA-CARTRIDGE CASE ADAPTED FOR DUAL-FORMAT APPLICATIONS

(75) Inventors: Armando Jesus Argumedo, Tucson, AZ (US); Edwin Ralph Childers, Tucson, AZ (US); Johnny L. Teale, Tucson, AZ (US); Richard Alex West, Corona, AZ (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 10/080,069

(22) Filed: Feb. 21, 2002

(65) Prior Publication Data

US 2003/0156356 A1 Aug. 21, 2003

(51) Int. Cl.[7] .......................... G11B 23/27; G11B 23/02
(52) U.S. Cl. ..................................................... 360/132
(58) Field of Search ................................. 360/132, 134, 360/131; 720/725, 728

(56) References Cited

U.S. PATENT DOCUMENTS

| | | | | |
|---|---|---|---|---|
| 4,201,356 | A | | 5/1980 | Schoettle et al. ........... 242/197 |
| 6,154,342 | A | | 11/2000 | Vanderheyden et al. .... 360/132 |
| 6,477,010 | B1 | * | 11/2002 | Johnson et al. ............. 360/132 |
| 6,522,500 | B1 | * | 2/2003 | Rudi .......................... 360/132 |
| 6,577,471 | B1 | * | 6/2003 | Morita et al. ............... 360/132 |
| 6,657,817 | B2 | * | 12/2003 | Morita ........................ 360/132 |
| 2001/0055178 | A1 | | 12/2001 | Stabile et al. ................. 360/94 |

FOREIGN PATENT DOCUMENTS

| | | |
|---|---|---|
| EP | 0288165 | 10/1988 |
| EP | 0924701 A2 | 12/1998 |
| EP | 0924703 A1 | 12/1998 |
| EP | 1 235 217 | 8/2002 |
| WO | WO 99/53495 | 10/1999 |

OTHER PUBLICATIONS

"Converting a 3494 Library Housing 3590 Tape Cartridges into a 3494 Library Housing Both 3590 and LTO Tape Cartridges". IBM Technical Disclosure Bulletin. Issue No. 436, p. No. 1473. Cross Reference: 0374-4353-0-436-1473. Aug. 2000.*

* cited by examiner

Primary Examiner—George J. Letscher
Assistant Examiner—Christopher R. Magee
(74) Attorney, Agent, or Firm—Antonio R. Durando; Quarles & Brady Streich Lang LLP

(57) ABSTRACT

A cartridge case has the same general geometry and dimensions of a Magstar cartridge, but with modified lateral sides with recessed surfaces and additional gripping notches that permit the alternative use of the cartridge with either a Magstar or an LTO type of automated picker. The width of the bottom rear portion of the cartridge is reduced to conform to the width of a standard LTO cartridge and LTO gripping notches are provided by increasing the depth of the locating notches of the Magstar format to the size required for engagement by the fingers in the gripper arms of an LTO automated picker. As a result of this modification, the cartridge of the invention can be alternatively handled by either Magstar or LTO type of automated pickers.

27 Claims, 7 Drawing Sheets

DATA-CARTRIDGE CASE ADAPTED FOR DUAL-FORMAT APPLICATIONS

BACKGROUND OF THE INVENTION

1. Field of the Invention

This invention relates generally to data storage tape cartridges and, in particular, to a cartridge that incorporates some standard features of both Magstar and LTO cartridge formats to provide compatibility with conventional drives, cartridge loaders and library cells of both systems.

2. Description of the Related Art

The removable media used in electronic data-storage equipment often takes the form of a magnetic tape cartridge. The portability of these units makes it possible to store large amounts of data in separate cartridges that can then be stored in readily accessible libraries or archived for future use. When, for example, a particular cartridge is needed for use in a computer, the unit is retrieved and loaded for processing, either manually or automatically.

Automatic retrieval is done either in libraries or automatic cartridge loaders (ACLs). Libraries use one or more movable automated pickers to retrieve cartridges from storage cells and load them into one or more I/O drives or other devices. ACLs use a movable magazine of cartridges and stationary robots to move cartridges to and from a drive.

The mechanism through which a cartridge is transferred and/or loaded into a computer peripheral, a device, or a library cell includes gripper arms that hold the cartridge and guide it in and out of the machine. Similarly, drives include retaining mechanisms that latch on to the cartridge by means of apposite locating and gripping notches or equivalent structural features built into the case of the cartridge. Accordingly, commercial cartridge formats are standardized to provide uniformity of construction and interchangeability of operation with cartridges produced by different manufacturers.

Two of the cartridge formats most widely used currently around the world are the so called Magstar and LTO formats, each characterized in detail by corresponding ECMA (European Computer Manufacturers Association) standards. Each format is prescribed structural attributes adapted to function with conforming standard features in the automated mechanisms of a corresponding drive, picker and library system. For example, a typical Magstar format cartridge 10 illustrated in FIGS. 1–3, such as IBM®'s 3590 Cartridge, is characterized by a sloped face 12 in the bottom of the rear side 14 and by a top side ridge 16 adapted for automatic engagement by an automated picker. As shown in FIG. 4, such a typical automatic picker 20 includes two horizontal, spring-loaded, gripper arms 22, 24 which, when pushed toward the rear side 14 of the cartridge 10, expand to overlap the top and bottom sides of the cartridge and firmly grip it for automated handling. A ridge 26 in the lower arm 22 butts against the lower edge of the sloped face 12 to provide a stop to the penetration of the cartridge within the gripper arms, while a lip 28 in the upper arm 24 provides a lock by engaging the ridge 16 in the top side 18 of the cartridge. Locating notches 30 are provided in the bottom of each lateral side 32, 34 for engagement by corresponding locating pins when the cartridge 10 is placed in a drive (not shown). These locating notches make it possible to locate the cartridge precisely within the drive so that the hub 36 in the bottom side 38 of the cartridge is properly aligned for engagement with the spindle of the motor in the drive. The dimensions of these features are all predetermined according to ECMA standards. For example, the sloped face 12 forms an angle α of 30 degrees with the plane of the bottom side 38 of the cartridge.

In similar fashion, a typical LTO format cartridge 40 illustrated in FIGS. 5–7, such as IBM®'s Ultrium/LTO Cartridge, is characterized by two gripping notches 42 extending upward from the bottom of each lateral side 44,46 of the cartridge, which are provided for automatic engagement by a corresponding automated picker. As shown in FIG. 8, an LTO-compatible picker 50 includes two vertical, spring-loaded, gripper arms 52,54 which, when pushed toward the rear side 56 of the cartridge 40, expand to overlap the lateral sides 44,46 of the cartridge and firmly engage it for automated handling. A finger 58 in each gripper arm 52,54 provides a lock by engaging the gripping notch 42 on the corresponding side of the cartridge. Locating notches 60 and 62 are provided in the bottom side 64 of the cartridge for engagement by corresponding fixed locating pins (not shown) when the cartridge 40 is placed in an LTO drive. These locating notches make it possible to place the cartridge 40 within the drive precisely so that the hub 66 in the bottom side 64 of the cartridge is aligned for engagement with the spindle of the motor in the drive. A V-shaped notch 68 in the bottom front side 70 of the cartridge 40 provides its initial alignment in the drive by engaging a stationary datum pin as the cartridge is inserted into the drive. Again, the dimensions of these features are all predetermined according to ECMA standards. For example, each gripping notch 42 is at least 4.75 mm deep and at least 8.70 mm high, and has a width of 6.00 mm±0.25 mm extending from about 14 mm to about 20 mm from the rear side of the cartridge 40. The locating notch 60 is an approximately square hole at least 5 mm deep and with a side of 3.00 mm±0.08 mm; its center is 20.50 mm±0.20 mm from the front side of the cartridge and 11.45 mm±0.20 mm from the left side. The locating notch 62 is a hole at least 5 mm deep defining an approximately oval aperture with a major dimension of at least 4.8 mm parallel to the cartridge's front side and a minor dimension of 3.00 mm±0.08 mm; its center is 20.50 mm±0.20 mm from the front side of the cartridge and 86.15 mm±0.25 mm from the center of the locating notch 60 (which places it 7.80 mm from the right side). The V-shaped notch 68 is at least 8.90 mm deep and has a rounded bottom with a maximum radius of 1.50 mm centered about 5.05 mm from the front side of the cartridge; the V-shaped sides of the notch 68 extend symmetrically from its bottom toward the front side of the cartridge at an angle of 60 degrees±1 degree.

Each format also utilizes different mechanisms to engage the tape in the drive for I/O operations. For example, Magstar-format cartridges use a leader block 72, while the LTO-format utilizes a leader pin (not shown in the prior-art figures). Because of these different specifications of each format, each cartridge is incompatible for use with drives, robots, and library systems of the other format. This invention provides a design for a cartridge case adapted for dual use with Magstar as well as LTO format robots and pickers.

BRIEF SUMMARY OF THE INVENTION

The primary objective of this invention is a cartridge case that is suitable for utilization in automated library systems that employ either Magstar-format or LTO-format cartridges.

Another objective of the invention is a cartridge case that is also suitable for receiving either a leader block or a leader pin assembly, such that the cartridge may be used either with a Magstar or an LTO type of drive.

A final objective is a multiple-purpose cartridge case that is also suitable for storage in automated library systems that employ either Magstar-format or LTO-format cartridges.

Therefore, according to these and other objectives, the invention consists of a cartridge case having the same general geometry and dimensions of a Magstar cartridge, but with modified lateral sides with recessed surfaces and additional gripping notches that permit the alternative use of the cartridge with either a Magstar or an LTO type of automated picker. The width of the bottom rear portion of the cartridge is reduced to conform to the width of a standard LTO cartridge and LTO gripping notches are provided by increasing the depth of the locating notches of the Magstar format to the size required for engagement by the fingers in the gripper arms of an LTO automated picker. As a result of this modification, the cartridge of the invention can be alternatively handled by either Magstar or LTO type of automated pickers.

According to another aspect to the invention, the bottom side of the cartridge is provided with locating notches having the same positional relationship to the front side of the case and, optionally, also to the center of the hub as the locating notches in the bottom side of an LTO cartridge. Thus, the cartridge can be adapted for use with LTO drive technology by replacing the leader block with a leader pin assembly. In addition, the cartridge of the invention may feature lateral notches adapted for engagement by spring-loaded retaining pins in conventional LTO library bins. Therefore, this embodiment of the invention is suitable for incorporation with LTO systems with minor modifications to the geometry of current LTO drives, but using the same positioning and driving mechanisms. Alternatively, the cartridge of the invention may retain conventional leader block technology for use with existing Magstar systems.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENTS OF THE INVENTION

This invention lies in the recognition that a minor modification to the structure of a conventional Magstar cartridge renders it suitable for dual utilization with Magstar as well as LTO automated picker systems. This advance is made possible by the fortuitous exact location of the lateral-side locating notches 30 in the Magstar format and of the gripping notches 42 in the LTO format with respect to the rear side of both cartridges. Additional changes to the case of a standard Magstar cartridge advantageously render it compatible also for alternative use in LTO libraries and in drives that utilize LTO technology.

For the purposes of this disclosure, Magstar format is defined as the magnetic-tape cartridge technology conforming to the specifications of ECMA-196 standards; similarly, LTO format is defined as the magnetic-tape cartridge technology conforming to the specifications of ECMA-999 standards, which are all well known in the art. The terms rear and front are used throughout in connection with the structures of the cartridges described herein to refer to the sides facing the gripper arms of an automated picker and facing the drive during use, respectively. Left and right refer to the cartridge lateral sides as they appear viewing the cartridge from its front side. The term bottom and top are used with reference to the side of each cartridge that contains the tape reel and hub for connection with a corresponding driving spindle in a drive and to its parallel opposite side, respectively. The terms high and height are used with reference to the direction between the bottom and top sides of the cartridge. The terms deep and depth are used with reference to the direction between the sides and the interior of the cartridge. When used with reference to notches in the sides of the cartridge, the terms wide and width refer to the dimension parallel to the relevant side of the cartridge.

Figure 9:
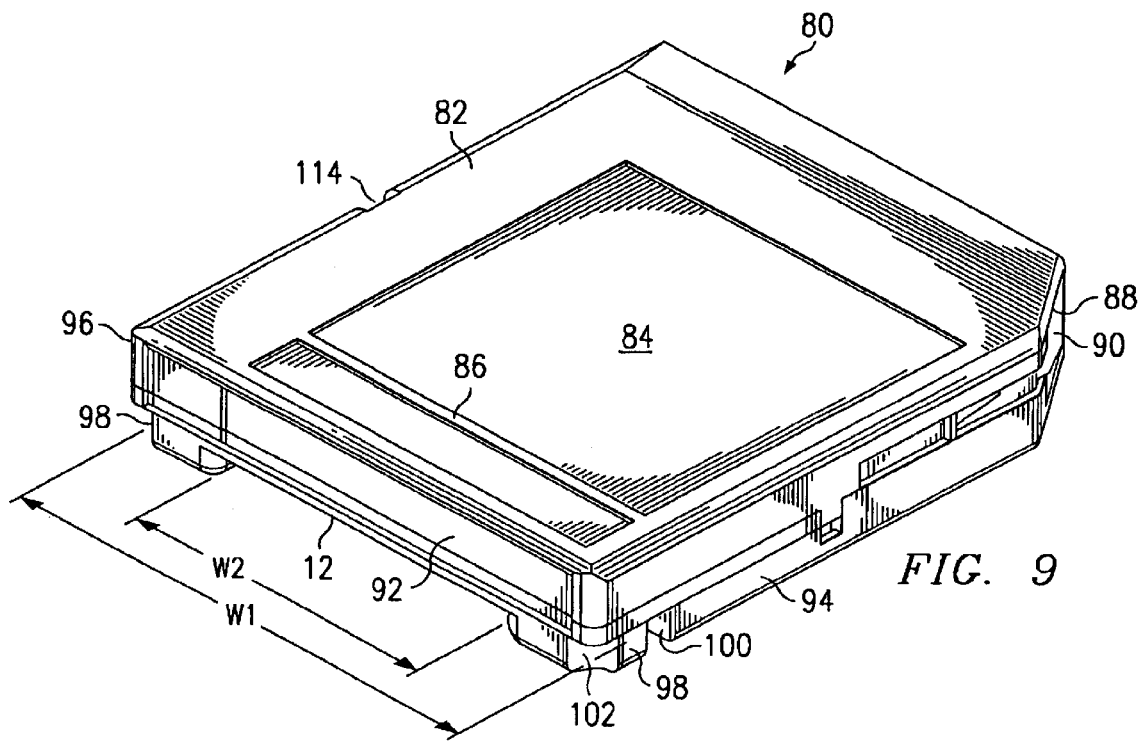
FIG. 9 is a perspective rear-side view of a cartridge according to the present invention.
Figure 10:
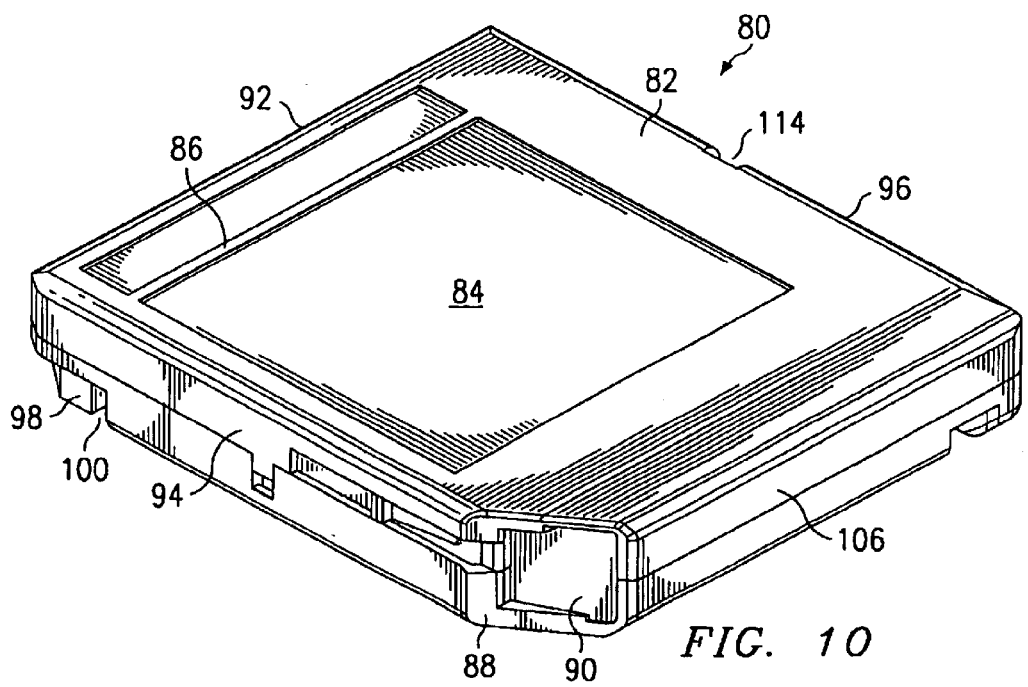
FIG. 10 is a perspective front-side view of the cartridge of FIG. 9.

Referring to the drawings, wherein like parts are designated throughout with like numerals and symbols, FIGS. 9 and 10 illustrate in perspective views a magnetic-tape cartridge 80 according to the invention. Except for the modifications herein described, the case of the cartridge 80 conforms to the international standard specifications of a Magstar cartridge. The top side 82 of the cartridge contains a recessed area 84 with a ridge 86 which, like the ridge 16 of the prior art, is adapted for automatic engagement by a Magstar automated picker. The front/left sides of the cartridge 80 are connected by a slanted corner side 88 with an opening for access to the tape within the case and a door 90 which is described in a separate disclosure. The angle and position of the corner side 88 within the geometry of the case is the same as the opening in a conventional Magstar cartridge, so that it can be adapted for use with a leader block according to Magstar technology or with a leader pin according to LTO technology. The cartridge 80 incorporates a leader pin housed within the case behind the door 90.

Figure 5:
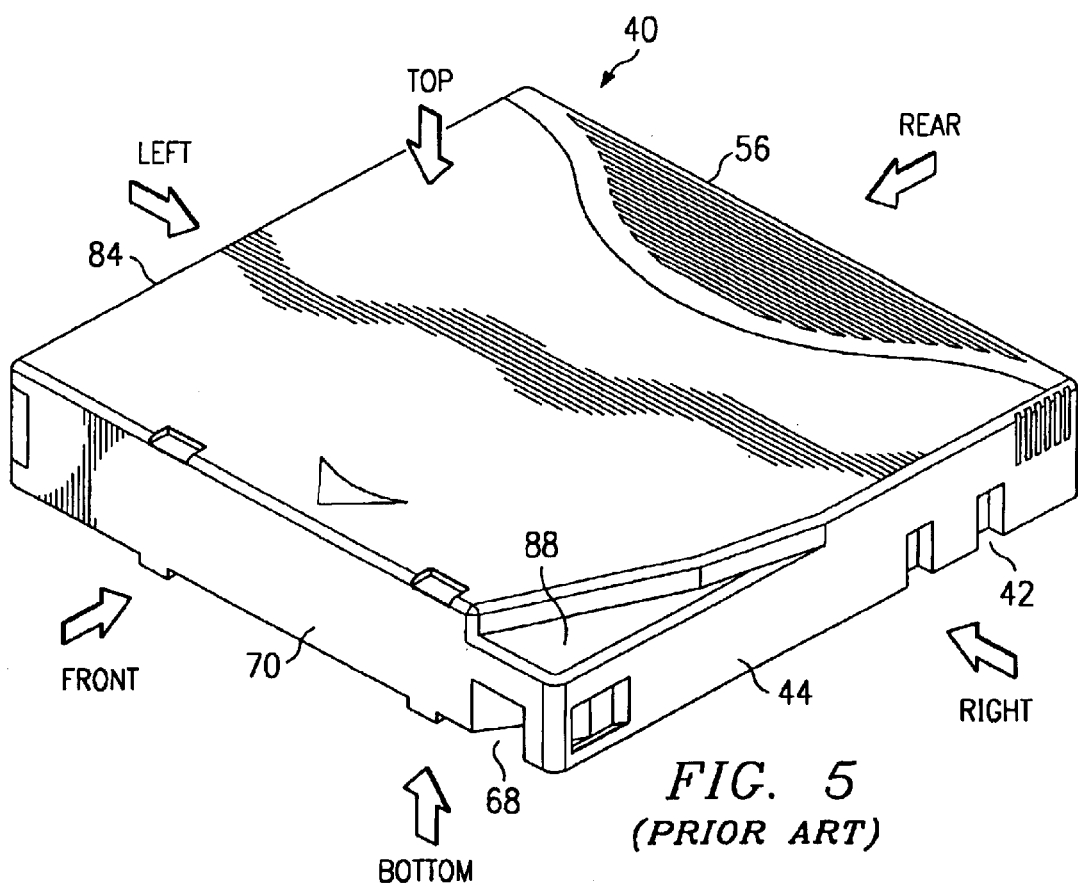
FIG. 5 is a perspective view of a conventional cartridge of the LTO format.
Figure 6:
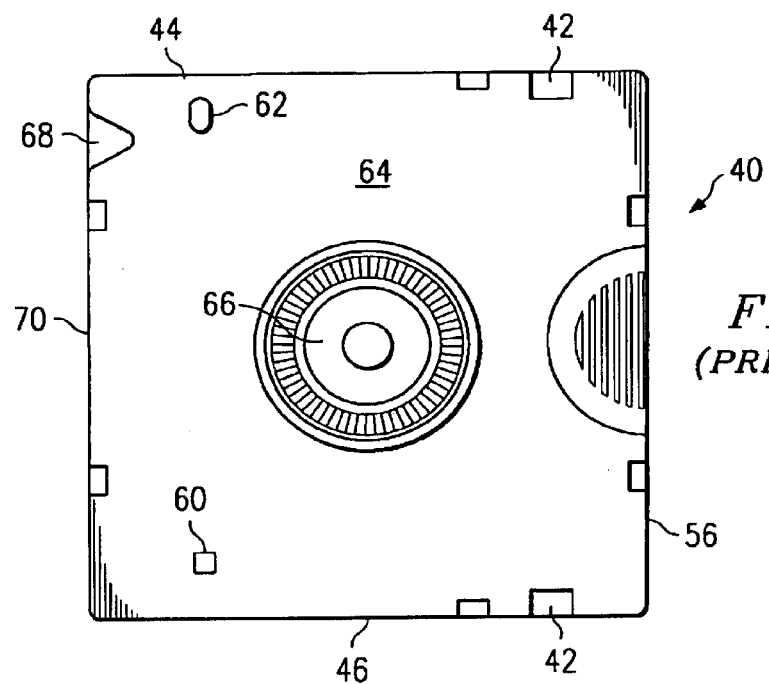
FIG. 6 is a plan view of the bottom side of the cartridge of FIG. 5.
Figure 7:
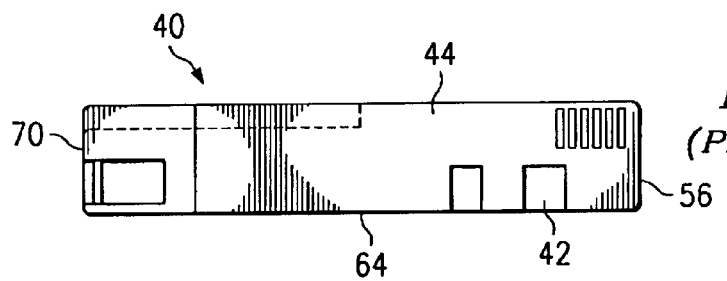
FIG. 7 is a side view of the cartridge of FIG. 5.
Figure 8:
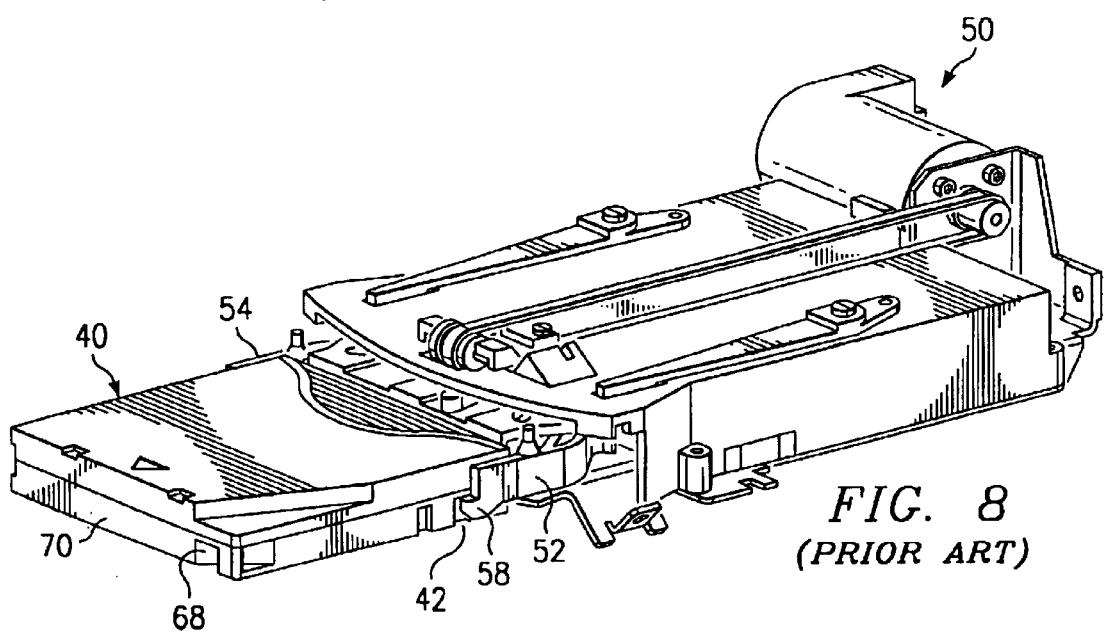
FIG. 8 is a perspective view of a conventional automated picker assembly for an LTO cartridge system, showing the cartridge clamped by the picker's gripper arms.
Figure 11:
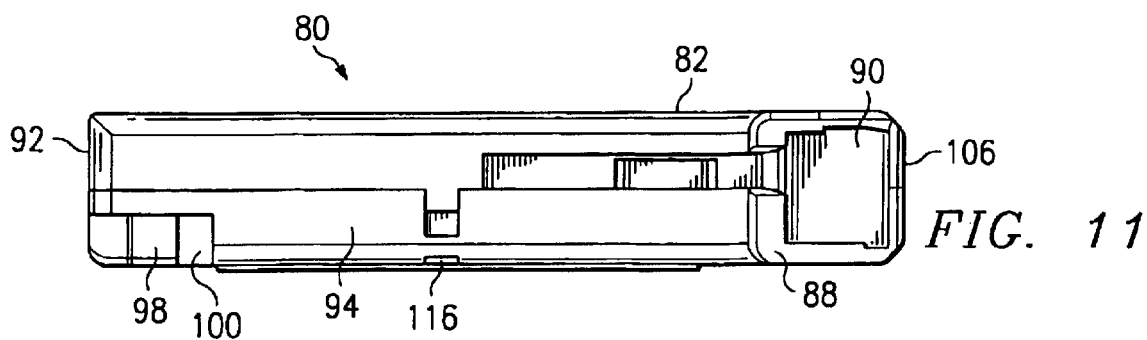
FIG. 11 is a left-side view of the cartridge of FIG. 9.
Figure 12:
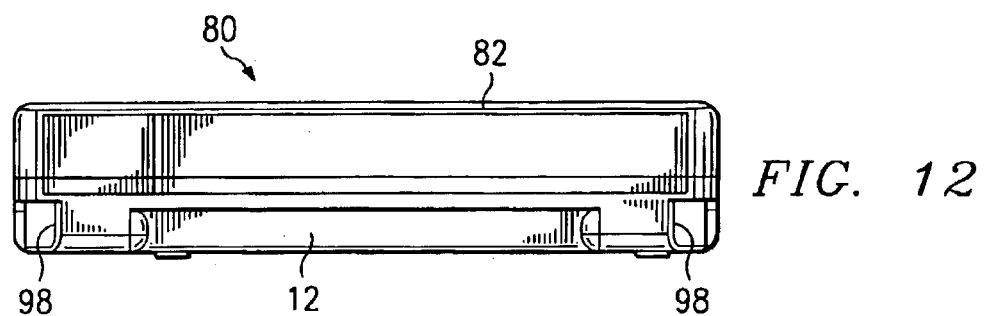
FIG. 12 is a rear-side view of the cartridge of FIG. 9.

According to the main aspect of the invention, as also illustrated in FIGS. 11 and 12, the bottom portion of the rear side 92 of the cartridge 80 is reduced in width to conform to the width of an LTO cartridge; that is, the width w1 shown in FIG. 9 is reduced from 109 mm±0.32 mm to 105.4 mm±0.30 mm by symmetrically trimming both cartridge lateral sides 94, 96 by about 1.8 mm, thereby providing a recessed surface 98 parallel in each lateral side extending to a distance of about 19.0 mm from the rear side 92 of the cartridge. This distance corresponds to the location of the front edge of the locating notches 30 in a standard Magstar cartridge (see FIG. 1). Since this distance also corresponds to the location of the front edge of the gripping notches 42 in a standard LTO cartridge with respect to its rear side (see FIG. 5), this correspondence is advantageously exploited to conform the cartridge 80 of the invention to LTO gripping-notch standards by providing gripping notches 100 in the same location in the recessed surface 98 on both sides of the cartridge. Specifically, each gripping notch 100 is at least 4.75 mm deep and at least 8.70 mm high from the bottom side 104 of the cartridge, and has a width of 6.00 mm±0.25 mm extending from about 14 mm to about 20 mm from the rear side 92 of the cartridge 80. Thus, the cartridge 80 is adapted for engagement by the fingers 58 of the gripper arms 52 of a conventional LTO automated picker (see FIG. 8).

It is noted that the recessed surface 98 on each side of the cartridge 80 is limited to the bottom portion of the cartridge because the original, Magstar-format width in the top portion needs to be retained to provide a continuous contact surface for rollers of standard Magstar driving mechanisms. Accordingly, to the extent that the gripping arms 52 of current LTO automatic pickers are higher than the height of the recessed surfaces 98, they need to be reduced in size to conform to their dimensions. No other change is required for complete compatibility with the cartridge 80 of the invention.

Figure 4:
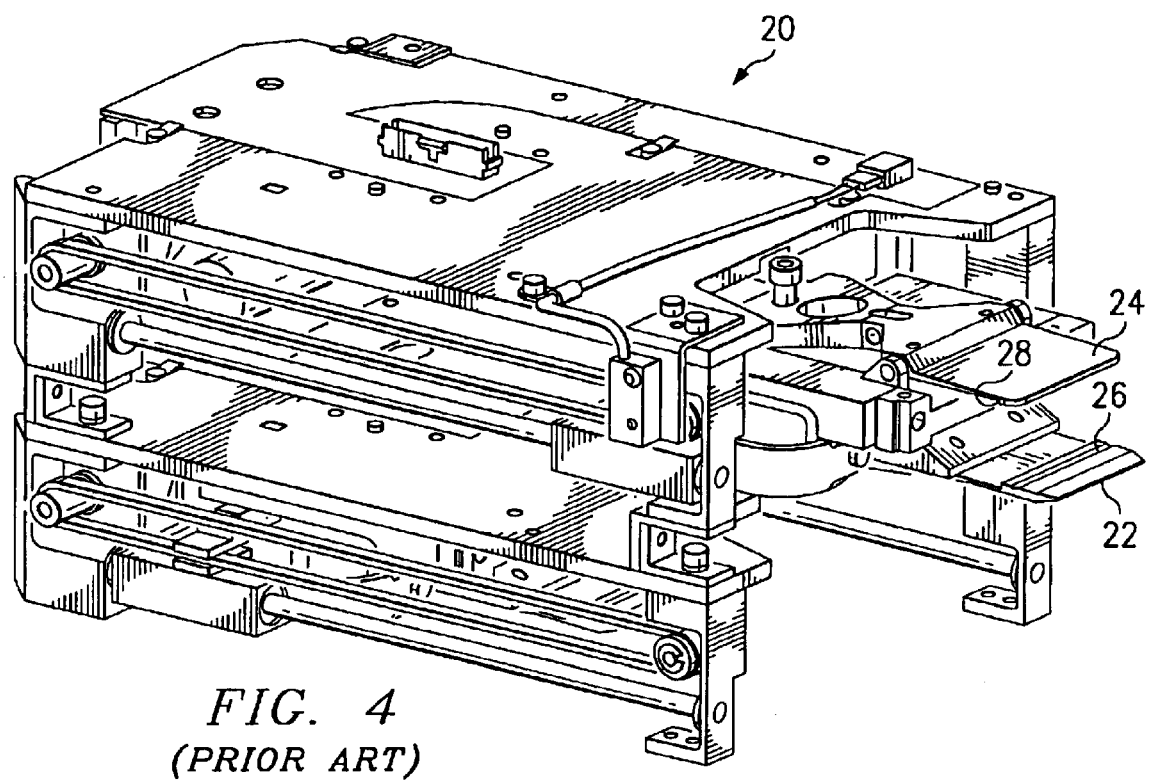
FIG. 4 is a perspective view of a conventional automated picker assembly for a Magstar cartridge system.
Figure 13:
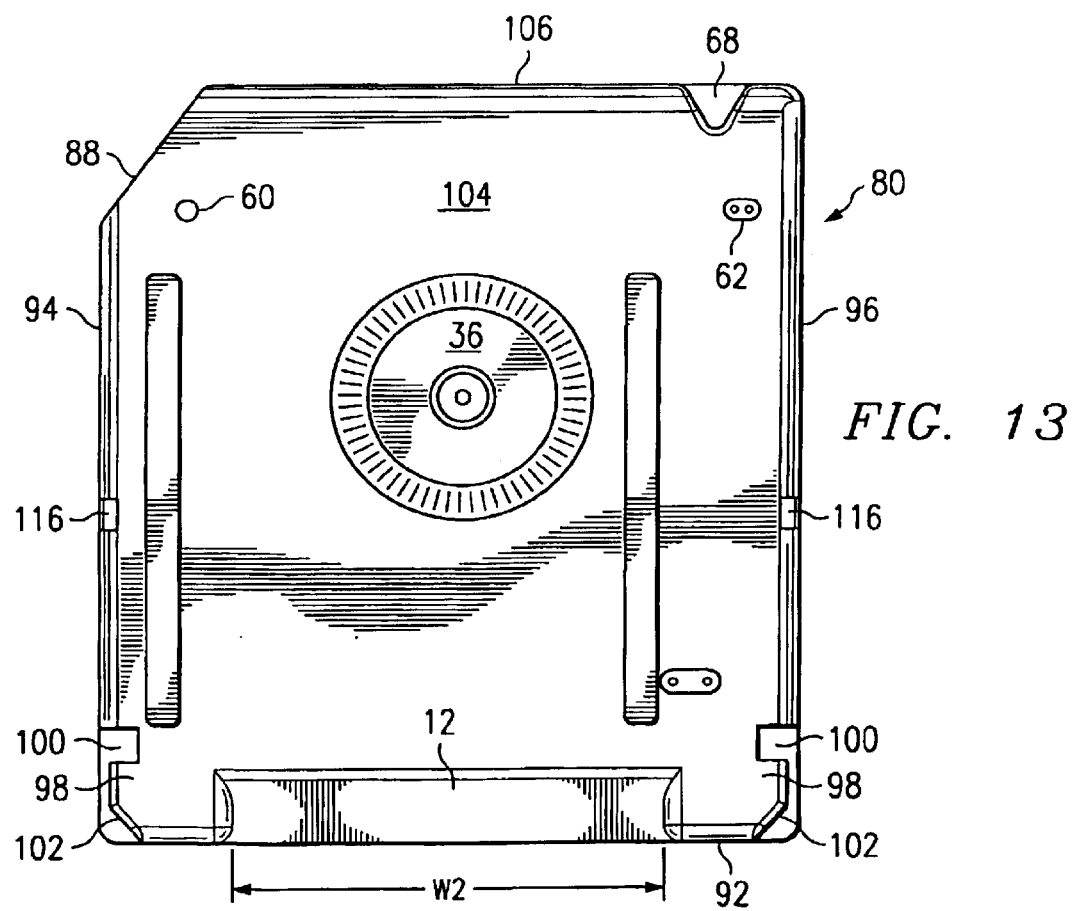
FIG. 13 is a plan view of the bottom side of the cartridge of FIG. 9.

As better illustrated in the bottom-side view of FIG. 13, the sloped face 12 of the Magstar format is retained in the cartridge 80 of the invention. The sloped face 12 in the rear side 92 is preferably reduced to extend over a width w2 shorter than the full width of the rear side, so as to provide a substantially full-height rear side at the corner edge with each lateral side. Thus, the resulting recessed surfaces 98 are larger than they would be if the sloped face 12 extended all the way to the lateral sides 94, 96 (as in the standard Magstar format) and the contact between the recessed surfaces 98 and the gripper arms 52 is thereby maximized for best gripping performance. So long as w2 is sufficiently large to accommodate the width of the lower gripper arm 22 of a Magstar automated picker (see FIG. 4), the sloped face 12 retains the gripper engagement characteristics of a Magstar cartridge. Accordingly, the cartridge 80 of the invention is advantageously capable of engagement by either Magstar or LTO conventional pickers. We found that a sloped-face width w2 of at least 67 mm is suitable to practice the invention, about 77 mm being preferred. Bezeled corner surfaces 102 may be provided to facilitate the initial engagement of the cartridge 80 by the gripper arms 52 of LTO automated pickers.

According to another aspect of the invention intended to provide compatibility with LTO drive technology, the bottom side 104 of the cartridge 80 (FIG. 13) is also fitted with locating notches 60 and 62 for engagement with corresponding locating pins in a conventional LTO drive. These locating notches have the same geometry and are positioned in the same geometrical relationship to each other and to the front side 106 of the cartridge 80 as in an LTO cartridge, so that standard locating reference pins in the drive can be used to position the cartridge of the invention. Thus, the locating notch 60 is an approximately square hole at least 5 mm deep and with a side of 3.00 mm±0.08 mm; its center is 20.50 mm±0.20 mm from the front side of the cartridge. The locating notch 62 is approximately oval at least 5 mm deep, with a major aperture dimension of at least 4.8 mm parallel to the cartridge's front side and a minor dimension of 3.00 mm±0.08 mm; its center is 20.50 mm±0.20 mm from the front side of the cartridge and 86.15 mm±0.25 mm from the center of the locating notch 60. The notches 60, 62 are preferably positioned about 13.25 mm from the left side 94 and about 9.60 mm from the right side 96, respectively, which places them in the same geometrical relationship with the recessed surfaces 98 that the corresponding notches have with the lateral sides in an LTO cartridge.

Figure 14:
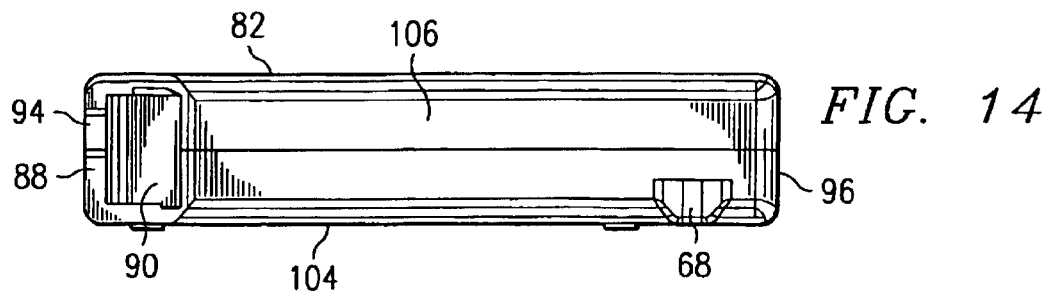
FIG. 14 is a front-side view of the cartridge of FIG. 9.
Figure 15:
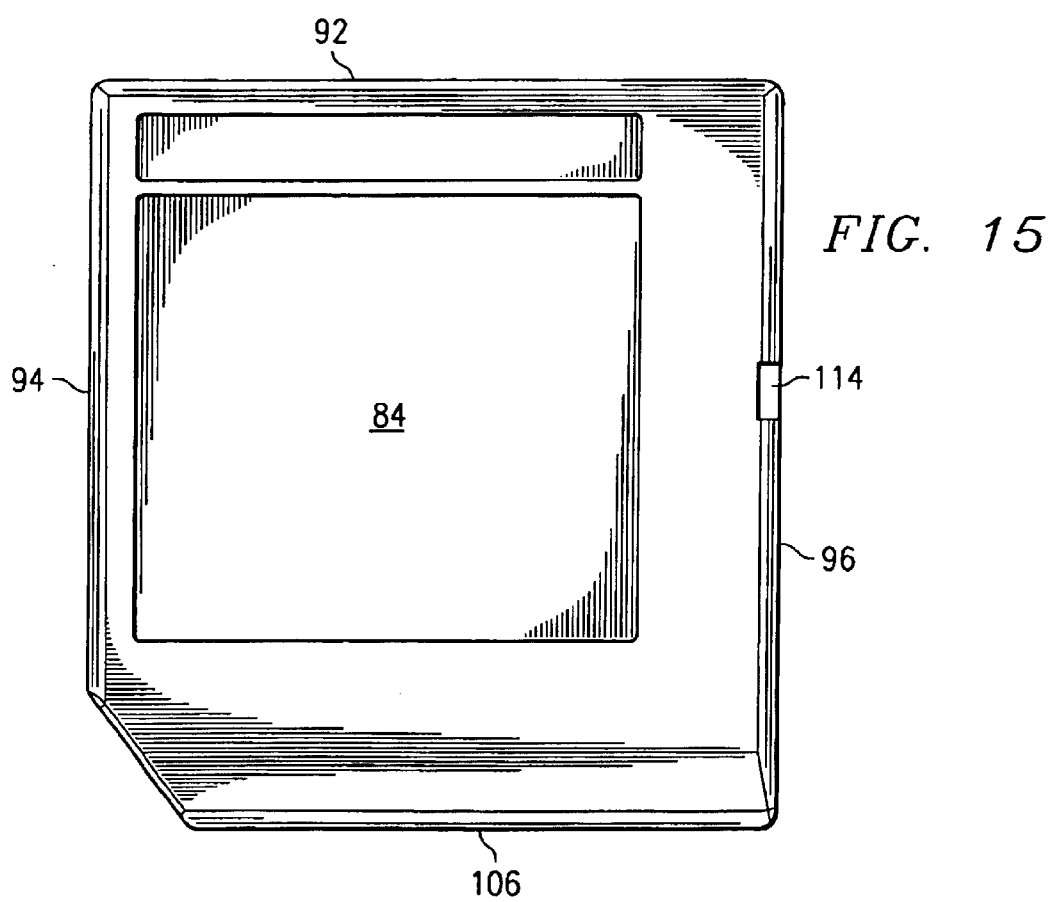
FIG. 15 is a plan view of the top side of the cartridge of FIG. 9.
Figure 16:
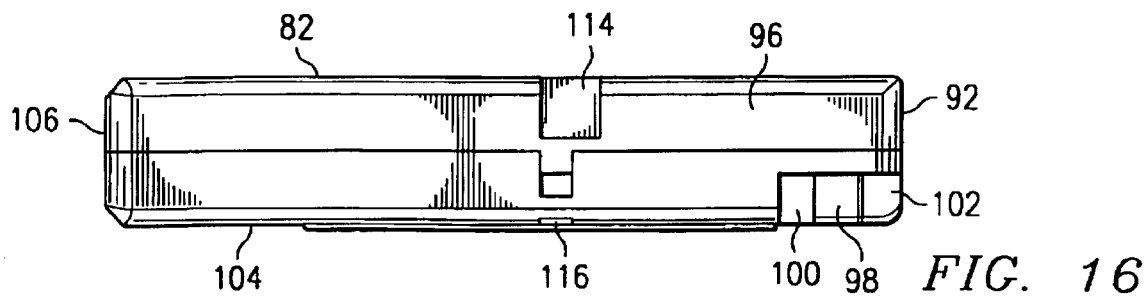
FIG. 16 is a right-side view of the cartridge of FIG. 9.

The same V-shaped notch 68 of the LTO format is also provided for the initial alignment of the cartridge within the drive, as seen more clearly in the front-side view of FIG. 14. Again, the V-shaped notch 68 is at least 8.90 mm deep and has a rounded bottom with a maximum radius of 1.50 mm centered about 5.05 mm from the front side of the cartridge; the V-shaped sides of the notch 68 extend symmetrically from its bottom toward the front side of the cartridge at an angle of 60 degrees±1 degree. The relative position of the notch 68 to the locating notches 60, 62 is retained exactly as in the LTO cartridge; that is, the center of its rounded bottom is about 4.20 mm further away from the right side of the cartridge than the center of the notch 62 (about 13.80 mm from the right side 96).

Preferably, by also retaining the relative position of the hub 36 with respect to the notches 60, 62, 68, the cartridge 80 of the invention is made fully compatible with LTO drive technology. That is, the center window of the hub 36 is positioned about 51.00 mm from the front side and about 55.70 mm from the left side of the cartridge. The only additional requirement is a modification to the receiving slot of conventional LTO drives to accommodate the larger Magstar size of the cartridge 80 of the invention; for example, the width of the slot needs to be enlarged by about 3.6 mm, the difference in width between Magstar and LTO cartridges.

Figure 1:
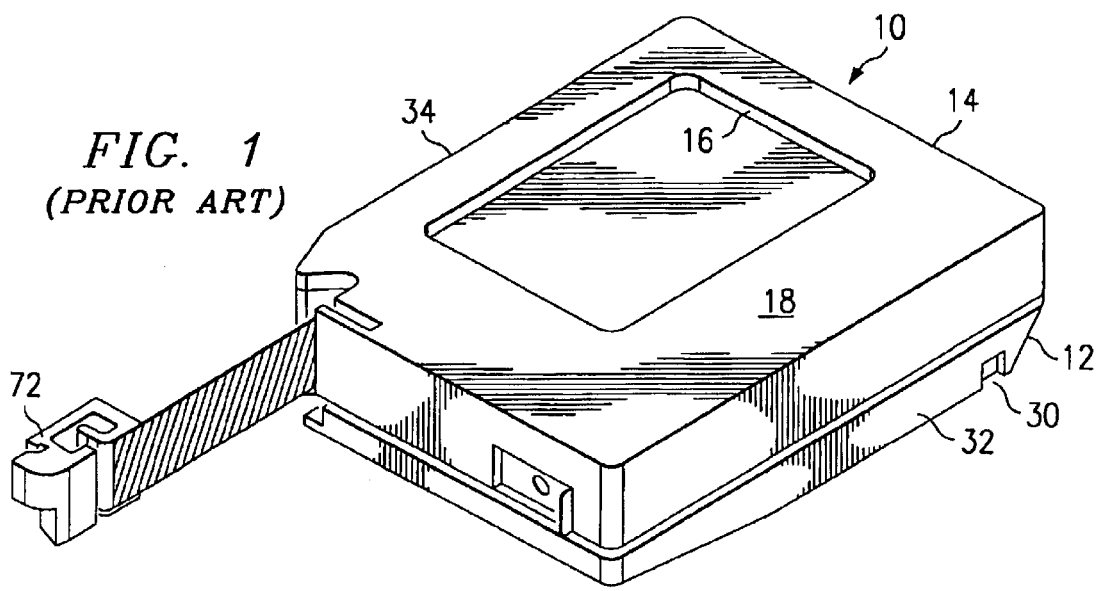
FIG. 1 is a perspective view of a conventional cartridge of the Magstar format.
Figure 2:
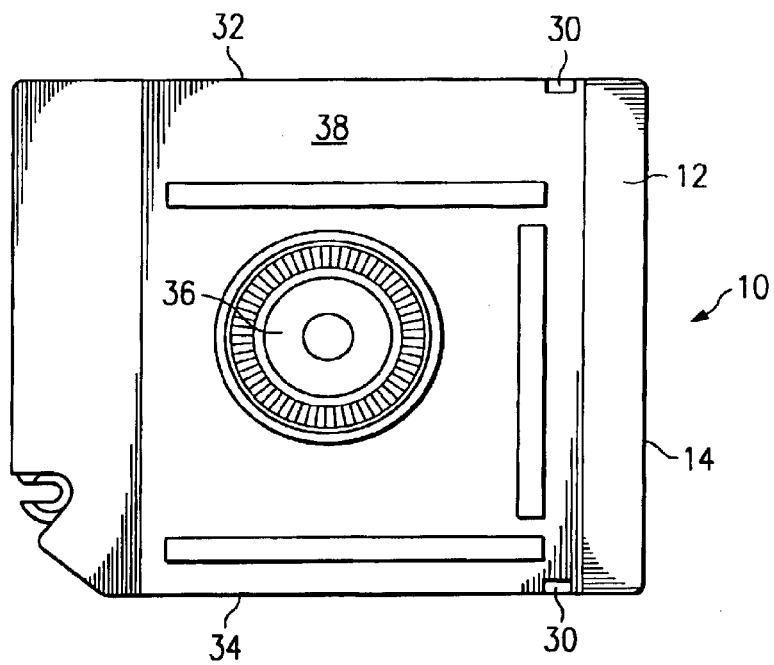
FIG. 2 is a plan view of the bottom side of the cartridge of FIG. 1.
Figure 3:
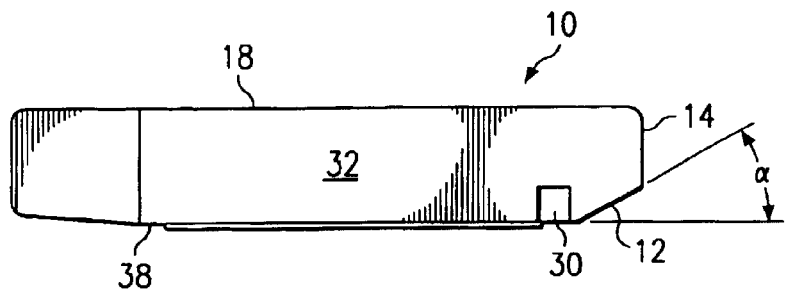
FIG. 3 is a side view of the cartridge of FIG. 1 showing the sloped face of the bottom of the rear side of the cartridge.
Figure 17:
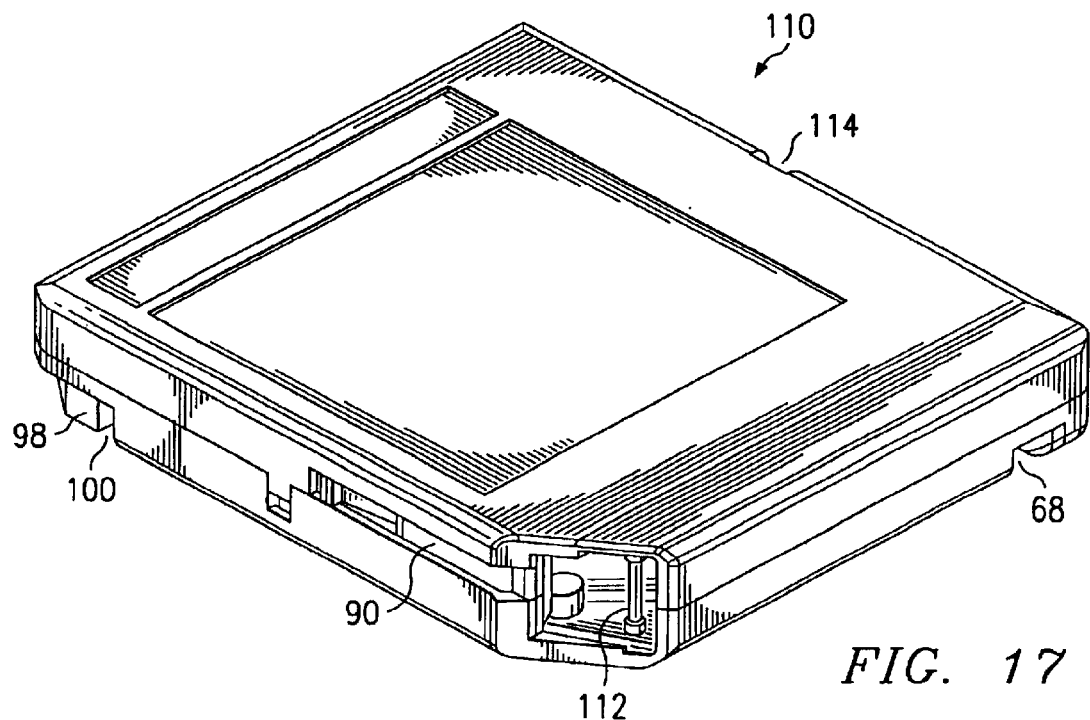
FIG. 17 is a perspective front-side view of the cartridge of FIG. 9 showing a leader pin assembly incorporated therein.
Figure 18:
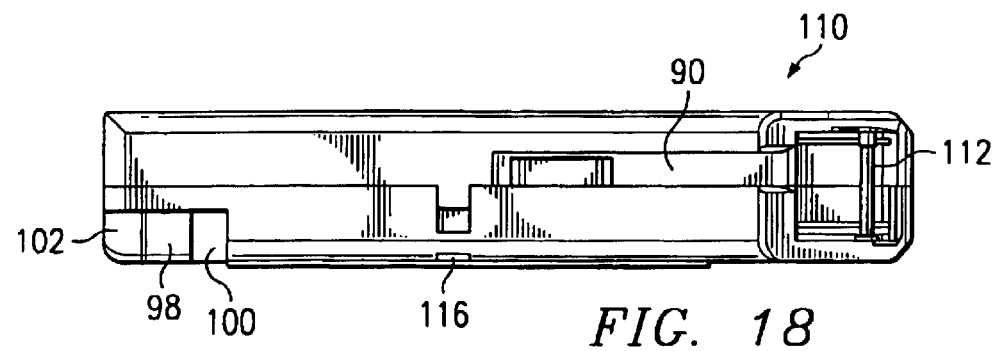
FIG. 18 is a left-side view of the cartridge of FIG. 17.

As mentioned, because the cartridge 80 of the invention is substantially sized and shaped as a conventional Magstar cartridge, it can be combined with a leader block assembly according to standard Magstar technology (as illustrated in FIG. 1). In that implementation the cartridge is fully compatible with all Magstar equipment currently in use in the art. Alternatively, the cartridge 80 may be combined with a leader pin assembly according to conventional LTO technology (as described, for example, in European Patent Applications EP 0924701, EP 0924702, EP 0924703, EP 0926675, and EP 0926676). FIGS. 17 and 18 illustrate such an embodiment 110 wherein a conventional leader pin assembly is incorporated within the cartridge of the invention. The figures show the cartridge with the door 90 in its open position and the pin 112 accessible for engagement by conventional LTO tape-drive technology.

The figures illustrate additional, non-critical features that may be implemented in the cartridge of the invention in order to improve its performance with minor modifications to conventional Magstar and/or LTO equipment. For example, a retaining notch 114 may be provided in the upper portion of the right side 96 of the cartridge in order to provide an anchoring site for a corresponding spring-loaded pin that may be incorporated in a library cell. Similarly, lock notches 116 (better seen in FIG. 13) may be provided in the bottom portion of each lateral side for engagement by corresponding locking pins that may be incorporated in future models of tape drives.

Thus, a new design of magnetic-tape cartridge is provided which can be used with either Magstar or LTO automated pickers and library systems. If equipped with a conventional leader block, the cartridge of the invention is suitable for use in conventional Magstar drives. If equipped with a leader pin assembly, the cartridge of the invention is also suitable for use with LTO drive technology with minor modifications for accommodating the larger dimensions of the cartridge.

Various changes in the details, steps and components that have been described may be made by those skilled in the art within the principles and scope of the invention herein illustrated and defined in the appended claims. For example, cartridge stacking features, write-inhibit features, labeling features, and the like can be added to the cartridge of the invention to conform to either the Magstar or the LTO format, depending on whether a leader block or a leader pin is used, respectively. Therefore, while the invention has been shown and described in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A dual-purpose magnetic-tape cartridge for alternative use in Magstar or LTO automated picker systems, comprising:
    a magnetic-tape cartridge having a top side, a bottom side, a front side, a rear side, two lateral sides, and a sloped face in the rear side conforming to Magstar format specifications;
    wherein a rear portion of each lateral side contains a recessed surface offset by about 1.8 mm therefrom and extending forward from said rear side; and said recessed surface further contains a gripping notch at least 4.75 mm deep, extending at least 8.70 mm in height from said bottom side, and extending about 6.00 mm in width from approximately 14 mm to approximately 20 mm from said rear side of the cartridge.

2. The cartridge of claim 1, wherein said sloped face does not extend to said lateral sides of the cartridge.

3. The cartridge of claim 2, wherein said sloped face extends at least 67 mm.

4. The cartridge of claim 2, further comprising a bezeled corner surface connecting said rear side to each of said lateral sides.

5. The cartridge of claim 1, further comprising a leader block assembly incorporated within an opening located between said left and front sides of the cartridge.

6. The cartridge of claim 1, further comprising a leader pin assembly incorporated within an opening located between said left and front sides of the cartridge.

7. The cartridge of claim 2, further comprising a leader block assembly incorporated within an opening located between said left and front sides of the cartridge.

8. The cartridge of claim 2, further comprising a leader pin assembly incorporated within an opening located between said left and front sides of the cartridge.

9. The cartridge of claim 4, further comprising a leader block assembly incorporated within an opening located between said left and front sides of the cartridge.

10. The cartridge of claim 4, further comprising a leader pin assembly incorporated within an opening located between said left and front sides of the cartridge.

11. A dual-purpose magnetic-tape cartridge for alternative use in Magstar or LTO robotic systems, comprising:
    a magnetic-tape cartridge having a top side, a bottom side, a front side, a rear side, two lateral sides, and a sloped face in the rear side conforming to Magstar format specifications;
    wherein said bottom side contains first and second locating notches for engagement with corresponding locating pins in a drive and a V-shaped notch for initial alignment of the cartridge within the drive;
    wherein said first locating notch is an approximately square hole at least 5 mm deep and with a side of 3.00 mm±0.08 mm, and said hole has a center located 20.50 mm±0.20 mm from said front side of the cartridge;
    wherein said second locating notch is an approximately oval aperture at least 5 mm deep, with a major dimension of at least 4.8 mm parallel to the cartridge's front side and a minor dimension of 3.00 mm±0.08 mm, and said aperture has a center 20.50 mm±0.20 mm from the front side of the cartridge and 86.15 mm±0.25 mm from the center of the first locating notch;
    wherein said V-shaped notch is at least 8.90 mm deep and has a rounded bottom with a maximum radius of 1.50 mm centered about 5.05 mm from the front side of the cartridge; and the V-shaped notch has sides that extend from the rounded bottom toward the front side of the cartridge at an angle of 60 degrees±1 degree; and
    wherein said first and second locating notches are positioned about 13.25 mm from the left side and about 9.60 mm from the right side of the cartridge, respectively.

12. A dual-purpose magnetic-tape cartridge for alternative use in Magstar or LTO robotic systems, comprising:
    a magnetic-tape cartridge having a top side, a bottom side, a front side, a rear side, two lateral sides, and a sloped face in the rear side conforming to Magstar format specifications;
    wherein said bottom side contains first and second locating notches for engagement with corresponding locating pins in a drive and a V-shaped notch for initial alignment of the cartridge within the drive;
    wherein said first locating notch is an approximately square hole at least 5 mm deep and with a side of 3.00 mm±0.08 mm, and said hole has a center located 20.50 mm±0.20 mm from said front side of the cartridge;
    wherein said second locating notch is an approximately oval aperture at least 5 mm deep, with a major dimension of at least 4.8 mm parallel to the cartridge's front side and a minor dimension of 3.00 mm±0.08 mm, and said aperture has a center 20.50 mm±0.20 mm from the front side of the cartridge and 86.15 mm±0.25 mm from the center of the first locating notch;
    wherein said V-shaped notch is at least 8.90 mm deep and has a rounded bottom with a maximum radius of 1.50 mm centered about 5.05 mm from the front side of the cartridge; and the V-shaped notch has sides that extend from the rounded bottom toward the front side of the cartridge at an angle of 60 degrees±1 degree; and
    wherein said rounded bottom of the V-shaped notch is centered about 13.80 mm from the right side of the cartridge.

13. The cartridge of claim 11, wherein said rounded bottom of the V-shaped notch is centered about 13.80 mm from the right side of the cartridge.

14. The cartridge of claim 11, wherein said bottom side includes a hub with a window for engagement with a spindle of a motor in the drive, and said window has a center positioned about 51.00 mm from the front side and about 55.70 mm from the left side of the cartridge.

15. The cartridge of claim 13, wherein said bottom side includes a hub with a window for engagement with a spindle of a motor in the drive, and said window has a center positioned about 51.00 mm from the front side and about 55.70 mm from the left side of the cartridge.

16. A dual-purpose magnetic-tape cartridge for alternative use in Magstar or LTO robotic systems, comprising:

a magnetic-tape cartridge having a top side, a bottom side, a front side, a rear side, two lateral sides, and a sloped face in the rear side conforming to Magstar format specifications;

wherein said bottom side contains first and second locating notches for engagement with corresponding locating pins in a drive and a V-shaped notch for initial alignment of the cartridge within the drive;

wherein said first locating notch is an approximately square hole at least 5 mm deep and with a side of 3.00 mm±0.08 mm, and said hole has a center located 20.50 mm±0.20 mm from said front side of the cartridge;

wherein said second locating notch is an approximately oval aperture at least 5 mm deep, with a major dimension of at least 4.8 mm parallel to the cartridge's front side and a minor dimension of 3.00 mm±0.08 mm, and said aperture has a center 20.50 mm±0.20 mm from the front side of the cartridge and 86.15 mm±0.25 mm from the center of the first locating notch;

wherein said V-shaped notch is at least 8.90 mm deep and has a rounded bottom with a maximum radius of 1.50 mm centered about 5.05 mm from the front side of the cartridge; and the V-shaped notch has sides that extend from the rounded bottom toward the front side of the cartridge at an angle of 60 degrees±1 degree; and wherein a rear portion of each lateral side contains a recessed surface offset by about 1.8 mm therefrom and extending forward from said rear side; and said recessed surface further contains a gripping notch at least 4.75 mm deep, extending at least 8.70 mm in height from said bottom side, and extending about 6.00 mm in width from approximately 14 mm to approximately 20 mm from said rear side of the cartridge.

17. The cartridge of claim 16, wherein said sloped face does not extend to said lateral sides of the cartridge.

18. The cartridge of claim 17, wherein said sloped face extends at least 67 mm.

19. The cartridge of claim 17, further comprising a bezeled corner surface connecting said rear side to each of said lateral sides.

20. The cartridge of claim 11, further comprising a leader block assembly incorporated within an opening located between said left and front sides of the cartridge.

21. The cartridge of claim 11, further comprising a leader pin assembly incorporated within an opening located between said left and front sides of the cartridge.

22. The cartridge of claim 15, wherein a rear portion of each lateral side contains a recessed surface offset by about 1.8 mm therefrom and extending forward from said rear side; and said recessed surface further contains a gripping notch at least 4.75 mm deep, extending at least 8.70 mm in height from said bottom side, and extending about 6.00 mm in width from approximately 14 mm to approximately 20 mm from said rear side of the cartridge.

23. The cartridge of claim 22, wherein said sloped face does not extend to said lateral sides of the cartridge.

24. The cartridge of claim 23, wherein said sloped face extends at least 67 mm.

25. The cartridge of claim 23, further comprising a bezeled corner surface connecting said rear side to each of said lateral sides.

26. The cartridge of claim 25, further comprising a leader block assembly incorporated within an opening located between said left and front sides of the cartridge.

27. The cartridge of claim 25, further comprising a leader pin assembly incorporated within an opening located between said left and front sides of the cartridge.

* * * * *